United States Patent
Ueki

(10) Patent No.: US 6,859,562 B2
(45) Date of Patent: Feb. 22, 2005

(54) CODED DATA LENGTH DETECTION APPARATUS, METHOD OF THE SAME, AND IMAGE CODING APPARATUS

(75) Inventor: Yuichi Ueki, Kanagawa (JP)

(73) Assignee: Sony Corporation, Tokyo (JP)

( * ) Notice: Subject to any disclaimer, the term of this patent is extended or adjusted under 35 U.S.C. 154(b) by 682 days.

(21) Appl. No.: 09/954,944

(22) Filed: Sep. 18, 2001

(65) Prior Publication Data

US 2002/0034332 A1 Mar. 21, 2002

(30) Foreign Application Priority Data

Sep. 19, 2000 (JP) .................................... P2000-283572

(51) Int. Cl.$^7$ ............................. G06K 9/36; G06K 9/46
(52) U.S. Cl. ....................................... 382/246; 382/251
(58) Field of Search ................................ 382/232, 233, 382/235, 244, 246, 250, 251; 341/50, 63, 65, 67; 375/240.03, 240.2, 240.23, 240.24

(56) References Cited

U.S. PATENT DOCUMENTS

| | | | | |
|---|---|---|---|---|
| 4,837,632 A | * | 6/1989 | Kubo et al. ............... | 348/208.6 |
| 5,402,123 A | * | 3/1995 | Jung ............................ | 341/63 |
| 5,563,661 A | * | 10/1996 | Takahashi et al. ........ | 348/390.1 |
| 5,784,494 A | * | 7/1998 | Strongin et al. ............ | 382/233 |
| 6,009,203 A | * | 12/1999 | Liu et al. ..................... | 382/233 |
| 6,353,685 B1 | * | 3/2002 | Wu et al. .................... | 382/250 |
| 6,453,120 B1 | * | 9/2002 | Takahashi et al. .......... | 386/109 |
| 6,567,562 B1 | * | 5/2003 | Nakayama et al. ......... | 382/246 |
| 6,671,411 B1 | * | 12/2003 | Satoh ......................... | 382/239 |
| 6,757,439 B2 | * | 6/2004 | Leeder et al. ............... | 382/246 |

* cited by examiner

Primary Examiner—Andrew W. Johns
Assistant Examiner—Amir Alavi
(74) Attorney, Agent, or Firm—Frommer Lawrence & Haug LLP; William S. Frommer

(57) ABSTRACT

A coded data length detection apparatus and method capable of detecting a coded data length at a high accuracy at a high speed, wherein original image data input to an image compression and coding circuit is processed by DCT at a DCT unit and quantized at a quantizer, quantization coefficients at this time is obtained by switching first set of scale coefficients and second set of scale coefficients in a lattice pattern in units of MCU of an image in scale coefficients switch, Huffman coding is performed on a quantized result at a Huffman coding unit, a data length is counted at a first compressed data length counter or a second compressed data length counter, and the counted data lengths is respectively multiplied by 2× at a first double multiplier or a second double multiplier to find a data length at the time of encoding the entire image by the respective scale factors.

17 Claims, 5 Drawing Sheets

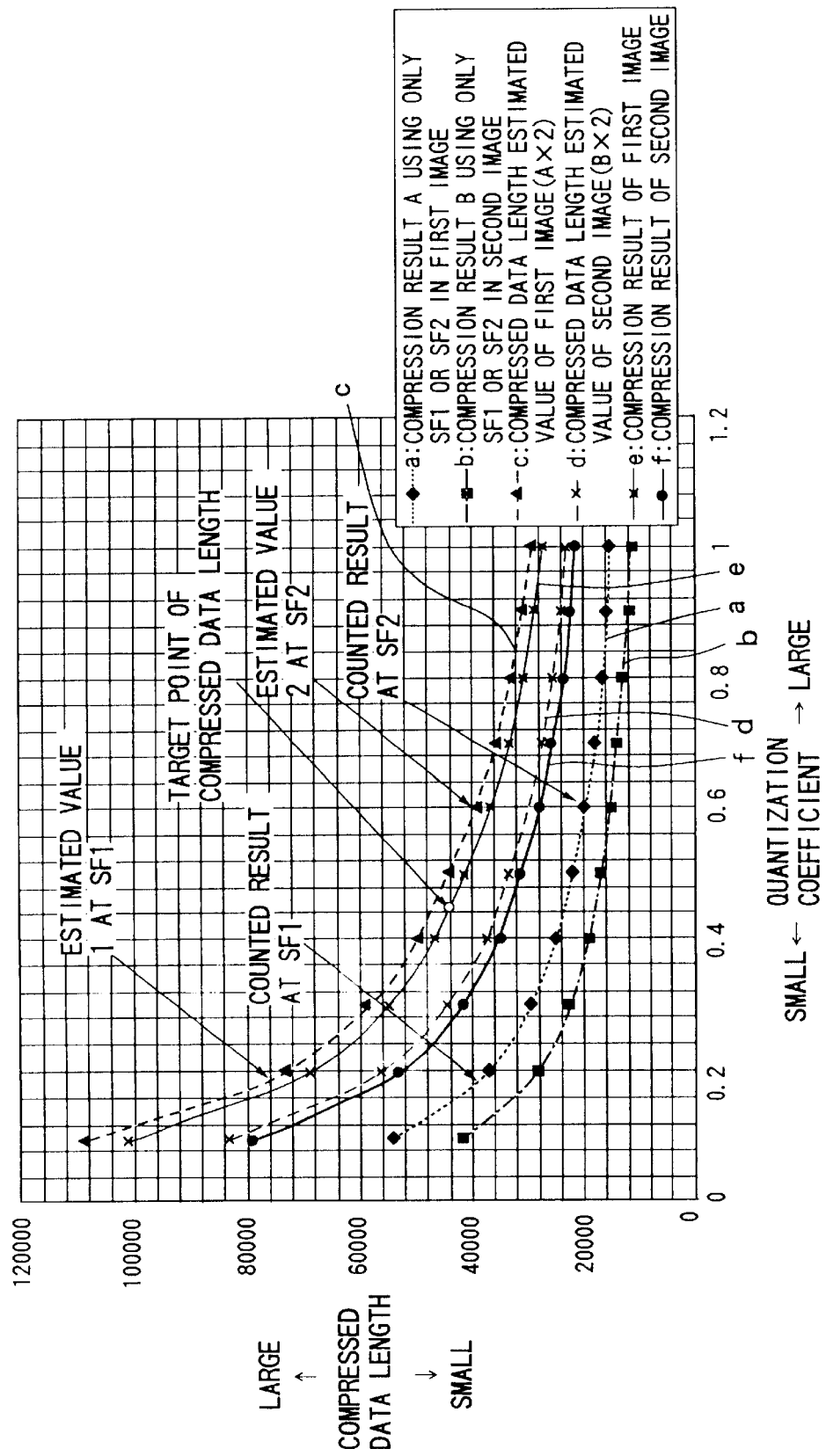

CODED DATA LENGTH DETECTION APPARATUS, METHOD OF THE SAME, AND IMAGE CODING APPARATUS

BACKGROUND OF THE INVENTION

1. Field of the Invention

The present invention relates to a coded data length detection apparatus and method suitable for use when detecting suitable quantization coefficients for making an amount of coded data a desired value in a coding scheme performing quantization of the Joint Photographic Experts Group (JPEG) etc. and to an image coding apparatus for coding the image data by using the detected quantization coefficients.

2. Description of the Related Art

FIG. 1 is a view of a standard circuit of the related art used when compressing and coding an image in a scheme using the JPEG and other discrete cosine transform (DCT).

In a compression and coding circuit 90 shown in FIG. 1, an input original data is processed DCT by a DCT unit 91 and an obtained DCT value is applied to a quantizer 92.

The quantizer 92 quantizes DCT coefficients input from the DCT unit 91 based on final quantization coefficients finally determined by multiplying basic quantization coefficients output from a quantization table 93 input from a multiplier 94 with variable for adjusting the final quantization coefficients, that is, "scale factor", and outputs the data of the quantized result to a Huffman encoder 95.

The Huffman encoder 95 performs Huffman coding based on Huffman coding coefficients in a Huffman coding table 96 and outputs the bit stream data of the coded result as a compressed image result.

Also, the data length of the compressed data is counted by a compressed data length counter 97.

Note that the data length of the compressed data changes in accordance with the variables given to the scale factors or the basic quantization coefficients in the quantization table. Accordingly, when the compressed data length has to be made a certain size, for example, in the case of making the data length a fixed length, the scale factors or the basic quantization coefficients are adjusted.

When making the compressed data a fixed length in the compression and coding circuit 90 of the related art configured in this way, the compressed data length is obtained by compressing the data several times while changing the scale factors or the basic quantization coefficients in the quantization table and determining the scale factors or final quantization coefficients most suitable for attaining a fixed length based on the result.

Note, when the length of the compressed image data is long, the coded data is accurate, but a total data of the compressed image data becomes large. If there is limitation on a memory capacity of a memory for storing the compressed image data, it is needed to find a suitable data length on the compressed image data by which a total compressed image data is storable and suitable high accuracy compressed image data can be obtained. Similarly, when transferring the compressed image data on a transfer line in a limit of a transfer speed thereof with suitable high accuracy compressed image data, it is needed to find a suitable data length.

In the compression and coding circuit 90 of the related art explained above, however, only one compressed data length is obtained by one compression. When n number of compressed data lengths are necessary for determining the scale factors or quantization table most suitable for attaining a fixed data length, it was necessary to repeat the compression processing n number of times. As a result, it suffers from the disadvantage that the processing time required for attaining a fixed length became long.

Also, to make the processing time shorter, when obtaining the scale factors most suitable for attaining a fixed length, the method is sometimes adopted of not compressing the entire original image, but compressing only a part of the original image and predicting the most suitable scale factors for attaining a fixed length based on the result.

However, frequency components of the part of the original image used for the prediction and of the entire original image, that is, the complexities, are not always same. There was therefore the disadvantage that the compressed data length could not be predicted at a high accuracy and it became impossible to attain a suitable fixed length.

SUMMARY OF THE INVENTION

An object of the present invention is to provide a coded data length detection apparatus and method capable of detecting a coded data length at a high accuracy and at a high speed.

Another object of the present invention is to provide an image coding apparatus capable of performing fixed length coding at a high speed and at high accuracy by detecting a coded data length at a high accuracy and at a high speed.

According to a first aspect of the present invention, there is provided a coded data length detection apparatus comprising: a frequency conversion means for frequency-converting a two dimensional arranged image data; a quantization coefficient providing means for providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data; a quantization means for reading one group of quantization coefficients among the plurality of groups of quantization coefficients from the quantization coefficients providing means and quantizating the data frequency-converted at the frequency conversion means by using the read one group of quantization coefficients; a coding means for coding the quantizated result; a coded data length calculation means for calculating a substantial data length of the coded results; and a control means for repeatedly operating the quantization coefficient providing means, the quantization means, the coding means and the coded data length calculation means by the number of the plurality of groups of the quantization coefficients to carry out the quantization, the coding and coded data length calculation on the frequency-converted data obtained at the frequency conversion means and the respective group of the quantization coefficients, to thereby obtain a plurality of data lengths of the plurality of coded results.

The frequency conversion means carries out a discrete cosine transform on the two dimensional image data, and the quantization means carries out the quantization on the discrete cosine transformed data.

The coded data length calculation means may comprise a data length calculation means for calculating the length of the data coded at the coding means, and a conversion means for converting the data calculated at the data length calculation means to a substantive data length in response to the discrete-arrangement of each block of the quantization coefficients.

The quantization coefficient providing means may comprise a quantization coefficient holding means for holding basis quantization coefficients, a plurality of scale factor holding means each holding one group of the factors, a switching means for selectively outputting ne group of scale factors from one of plurality of scale factor holding means in response to a command from the control means, and a multification means for multfying the scale factors output from the switching means and the basic quantization coefficients and outputting the same to the quantization means.

Each of the plurality of scale factors may comprise a plurality of blocks of scale factors, discretely arranged in a two dimensional lattice, the arrangement of blocks being substantially equivalent to that of the arrangement of blocks of the quantization coefficients.

Alternatively, the quantization coefficient providing means may comprise a quantization coefficient holding means for holding the plurality of groups of quantization coefficients, previously obtained by multifying basis quantization coefficients and a plurality of groups of scale factors, and the quantization coefficient holding means outputs one group of quantization coefficients among the plurality of groups of quantization coefficients in response to a command from the control means.

According to a second aspect of the present invention, there is provided a coded data length detection method comprising the steps of: frequency-converting a two dimensional arranged image data; providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data; reading one group of quantization coefficients among the plurality of groups of quantization coefficients and quantizating the frequency-converted data by using the read one group of quantization coefficients; coding the quantizated result; calculating a substantial data length of the coded results; and repeatedly operating the quantization coefficient providing means, the quantization means, the coding means and the coded data length calculation means by the number of the plurality of groups of the quantization coefficients to carry out the quantization, the coding and coded data length calculation on the frequency-converted data and the respective group of the quantization coefficients, to thereby obtain a plurality of data lengths of the plurality of coded results.

According to a third aspect of the present invention, there is provided an image data coding apparatus comprising: a frequency conversion means for frequency-converting a two dimensional image data; a quantization coefficient providing means for providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data; a quantization means for reading one group of quantization coefficients among the plurality of groups of quantization coefficients from the quantization coefficients providing means and quantizating the frequency-converted data at the frequency conversion means by using the read one group of quantization coefficients; a first coding means for coding the quantizated result; a coded data length calculation means for calculating a substantial data length of the coded results; a control means for repeatedly operating the quantization coefficient providing means, the quantization means, the coding means and the coded data length calculation means by the number of the plurality of groups of the quantization coefficients to carry out the quantization, the coding and coded data length calculation on the frequency-converted data obtained at the frequency conversion means and the respective group of the quantization coefficients, to thereby obtain a plurality of data lengths of the plurality of coded results; an evaluation means for evaluating the plurality of data lengths and the plurality of coded data, obtained by using the plurality of groups of quantization coefficients to decide a suitable data length; and a second coding means for coding the image data by using the group of quantization coefficients by which the suitable data length is obtained.

According to a fourth aspect of the present invention, there is provided an image data coding method comprising the steps of: frequency-converting a two dimensional image data; providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data; reading one group of quantization coefficients among the plurality of groups of quantization coefficients and quantizating the frequency-converted data by using the read one group of quantization coefficients; coding the quantizated result; a coded data length calculation means for calculating a substantial data length of the coded results; repeatedly operating the quantization, the coding and coded data length calculation on the frequency-converted data and the respective group of the quantization coefficients, by the number of the groups of the quantization coefficients, to thereby obtain a plurality of data lengths of the plurality of coded results; evaluating the plurality of data lengths and the plurality of coded data, obtained by using the plurality of groups of quantization coefficients to decide a suitable data length; and coding the image data by using the group of quantization coefficients by which the suitable data length is obtained.

BRIEF DESCRIPTION OF THE DRAWINGS

These and other objects and features of the present invention will become clearer from the following description of the preferred embodiments given with reference to the attached drawings, in which:

FIG. 5 is a view of the result when finding the relationship of a compressed data length and quantization coefficients by switching scale factors.

DESCRIPTION OF THE PREFERRED EMBODIMENTS

An image compression and coding circuit according to the preferred embodiments of the present invention will be described with reference to FIG. 2 to FIG. 5.

A first embodiment of the present invention will be described by taking as an example an image compression and coding circuit for JPEG coding on still image data.

First, the configuration of the image compression and coding circuit will be described.

Figure 2:
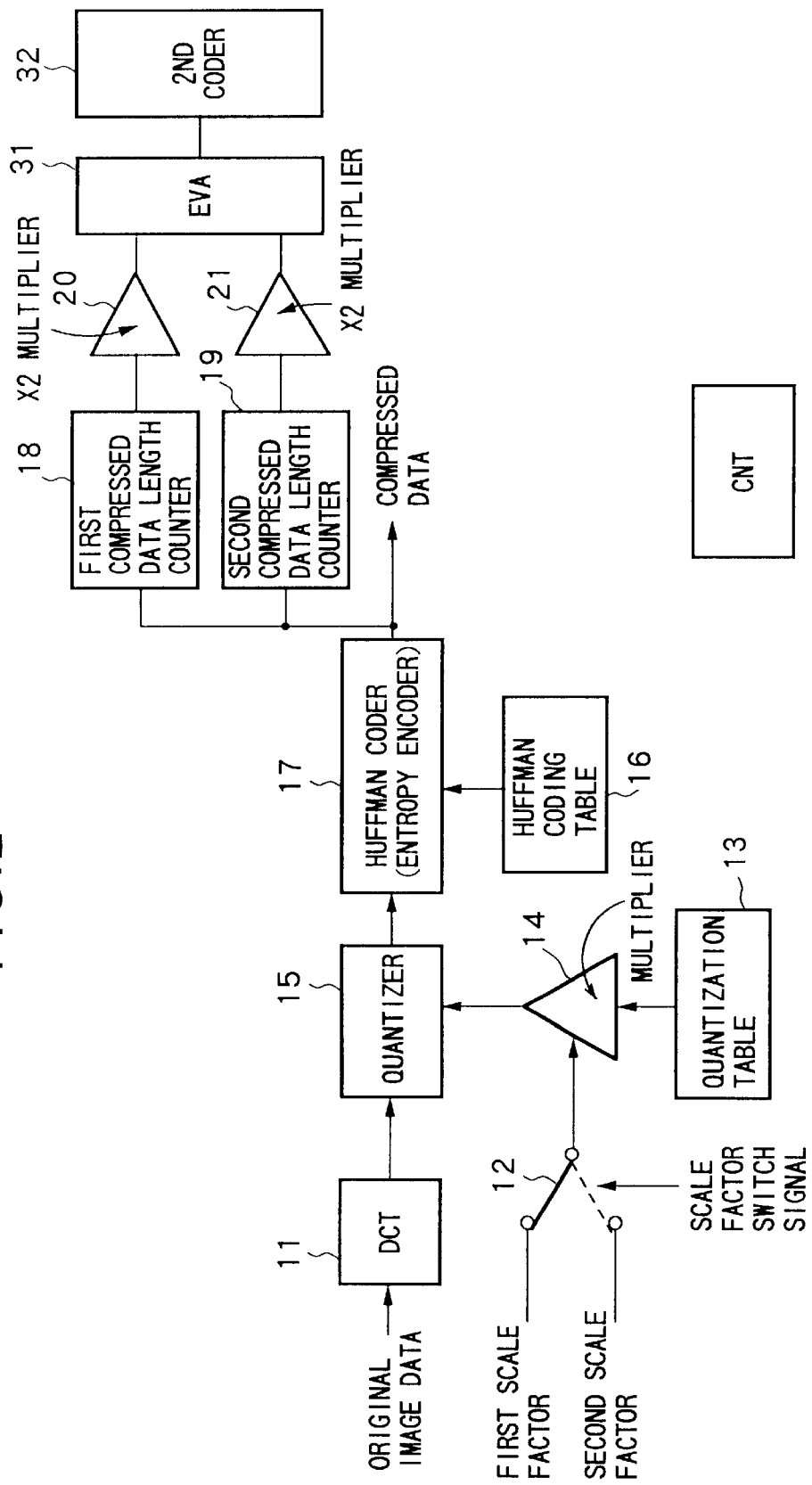
FIG. 2 is a view of the configuration of a compression and coding circuit according to a first embodiment of the present invention.

FIG. 2 is a block diagram of the configuration of an image compression and coding circuit 10 of the first embodiment.

The image compression and coding circuit 10 comprises a discrete cosine transform (DCT) unit 11, a scale factor switch 12, a quantization table 13, a multiplier 14, a quantizer 15, a Huffman coding table 16, a Huffman coder 17, a first compressed data length counter 18, a second compressed data length counter 19, a first double multiplier 20, and a second double multiplier 21.

The image compression and coding circuit 10 further comprises a controller CNT of, for example, a micro computer, for controlling the operation of the DCT unit 11, the scale factor switch 12, the quantization table 13, the multiplier 14, the quantizer 15, the Huffman coding table, the Huffman encoder 17, the counters 18 and 19, and the multipliers 20 and 21. In particular, the controller CNT repeatedly controls the operation of the above units 12 to 21 except for the DCT unit 11 to obtain a plurality of data length of the coded image data on the plurality groups of the quantization coefficients.

An image coded data length calculation apparatus of the present invention is constructed by the above units 11 to 21.

An image data coding apparatus of the present invention comprises an evaluating unit (means) 31 and a second coding unit (means) 32 in addition to the image coded data length calculation apparatus consisting of the units 11 to 21.

The DCT unit 11 processes the discrete cosine transform (DCT) which is and example of a frequency conversion of the present invention to original image data and outputs obtained DCT coefficients to the quantizer 15.

The scale factor switch 12 selects one of a set (group) of first scale factors (SF1) and a set of second scale factors (SF2) stored in the controller CNT based on a scale factor switching signal generated in the controller CNT and applies the same to the multiplier 14.

Figure 3:
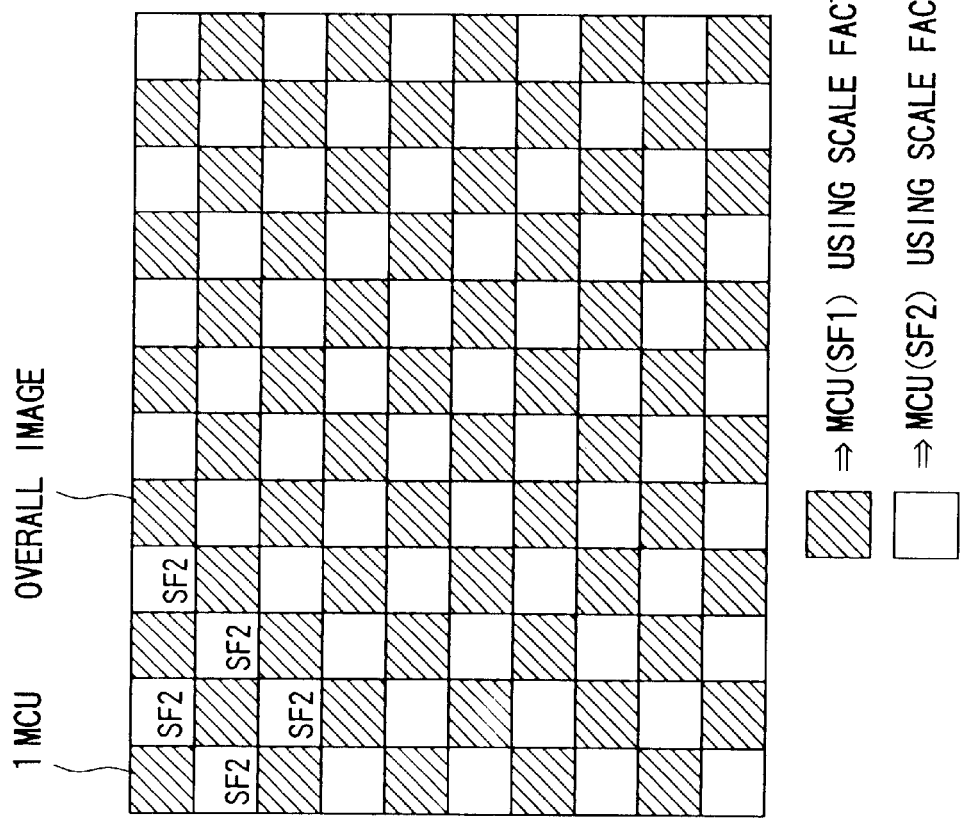
FIG. 3 is a view of an arrangement of two sets of scale factors.

In the first embodiment, one set of scale factors is switched so that the first scale factors (SF1) and the second scale factors (SF2) which are arranged in a lattice (or a checker board) pattern for an overall image data in minimum coded units (MCU) as shown in FIG. 3. are selected The image data which is performed by the quantization, coding, detection of a length of the coded data, is arranged in a two dimensional lattice (or a checker board) as shown in FIG. 3. The size of one frame of the image data is, for example, one frame of television image data consisting of a plurality of blocks arranged in a two dimensional lattice (matrix). Each block consists of, for example, 8×8 pixel image data or 16×16 pixel image data, and is defined as the minimum coding unit (MCU) which is one unit for performing the quantization and coding.

As shown in FIG. 3, as one unit of the minimum coding unit (MCU), the first and second sets (groups) scale factors are arranged in the lattice pattern. The reason of the arrangement of two sets of scale factors and the switching for selecting one of two sets of scale factors is to produce two sets (groups) of final quantization coefficients by multiplying the basic quantization coefficients and the one selected set of scale factors. If the number of the groups of the final quantization coefficients should increase more than two, the number of the sets of scale factors should increase. In addition, the reason of the arrangement of the two sets of scale factors alternatively and discrete every unit of the MCU, is to apply the final quantization coefficients obtained at the multiplier 14 to the total one frame of the two dimensional image data substantially even. Normally, since the image data continues in a two dimensional directions, the applications of the final quantization coefficients obtained by multiplying the basic quantization coefficients and the alternatively and discretely arranged scale factors to the DCT performed image data, is substantially equal to the application of evenly and continuously arranged quantization coefficients to the DCT performed image data.

The sizes of the blocks and the MCUs are defied in accordance with the character or feature of the image data to be coded.

The quantization table 13 holds previously obtained basic quantization coefficients and outputs the same to the multiplier 14 in accordance with a request (command) of the controller CNT.

The multiplier 14 multiplies the basic quantization coefficients output from the quantization table 13 with the scale factors selected by the scale factor switch to obtain final quantization coefficients to be finally used in the quantizer 15 and outputs the same to the quantizer 15. In this way, by multiplying the basic quantization coefficients and the selected set of scale factors, the final quantization coefficients used in the quantizer 15 can be varied.

The quantizer 15 successively quantizes the DCT coefficients input from the DCT unit 11 based on the final quantization coefficients input from the multiplier 14 and outputs the same to the Huffman coder 17.

The Huffman coding table 16 outputs Huffman coding coefficients stored in the table used in the for Huffman coder 17 in accordance with a request of the controller CNT. The Huffman coder 17 performs Huffman coding on the quantized results input from the quantizer 15 based on the Huffman coding coefficients output from the Huffman coding table 16 and outputs the result as data of a compressed result to the image compression and coding circuit 10 and to the first compressed data length counter 18 and the second compressed data counter 19.

The Huffman coding is one example of a coding of the present invention.

The first compressed data length counter 18 counts a data length of the compressed data from the Huffman encoder 15 where the set of scale factors used for obtaining the final quantization coefficients for the quantization in the encoder 15 are the first set of scale factors and outputs the same to the first double multiplier 20.

The second compressed data length counter 19 counts a data length of the compressed data from the Huffman encoder 15 where the set of scale factor used for obtaining quantization coefficients for the quantization in the encoder 15 are the second set of scale factors and outputs the same to the second double multiplier 21.

The controller CNT switches the operation either the first compressed data length counter 18 and the first double multiplier 20, or the second compressed data length counter 19 and the second double multiplier 21 in response to the switching operation of the scale factor switch 12, or selects either the result of the first double multiplier 20, or the result of the second double multiplier 21 as the effective result.

The reason of the double multiplication in the first and second double multiplication will be described. As seen from the arrangement of the one set of scale factors in FIG. 3, the processing was made to a half of one frame of the image data. Then, the conversion of the data length for one frame of the image data is required by doubling.

The first double multiplier 20 carries out the multiplication of 2× (a data length of the compressed data input from the first compressed data length counter 18) and outputs the result as a data length of compressed data when using the first set of scale factors (SF1) as the scale factor.

The second double multiplier 21 carries out the multiplication of 2× (a data length of the compressed data input from the second compressed data length counter 19) and outputs the result as a data length of compressed data when using the second set of scale factors (SF2) as the scale factor.

Next, the operation of the image compression and coding circuit 10 will be described.

The original image data input to the image compression and coding circuit 10 is processed by DCT in the DCT unit 11, then quantized in the quantizer 15. The quantization coefficients used at this time is defined by the first set of scale factors (SF1) or the second set of scale factors (SF2) in a lattice pattern as shown in FIG. 3 in units of the MCUs of the image.

The quantized result is coded by Huffman coding in the Huffman encoder 17 to generate compressed data. Then, the compressed data length is counted in the first compressed data length counter 18 and the second compressed data length counter 19 for each of the first set of scale factors (SF1) or the second set of scale factors (SF2), selected by the scale factor switch 12.

Since the calculated results are each values of results of compression on ½ of the entire image, as shown in the arrangement of the scale factors, the total compressed data length is obtained by multiplying by 2× (the counted compressed data length) in the first double multiplier 20 or the second 2× multiplier 21.

The controller CNT controls, first, the operations of the quantization, Huffman coding and data length calculation when selecting the output of the first set of scale factors, and second, the operations same as the above when selecting the output of the second set of scale factors. Namely, in this embodiments, the switch 12, the quantization table 13, the multiplier 14, the quantizer 15, the Huffman coding table 16, and the Huffman coder 17 are operated two times. But, the DCT unit 11 operates one time for the image data. The operation time in the DCT unit 11 is long than that of the above portions 12 to 17, and thus, the reduction of the operation of the DCT unit 11 to one time may result in a shortage of the total operation time of the circuit 10.

Figure 4:
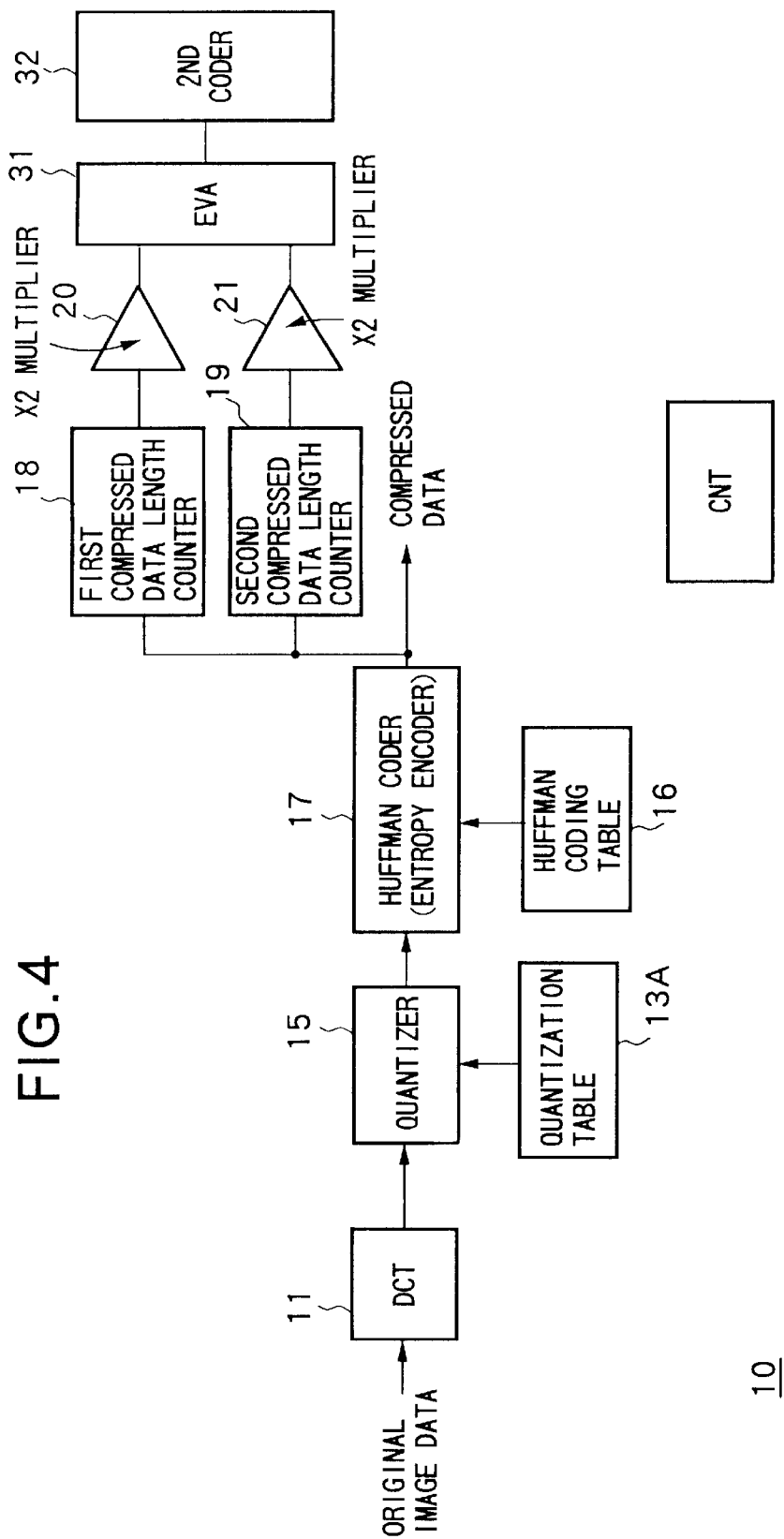
FIG. 4 is a view of the modification of the compression and coding circuit shown in FIG. 2.

To further shorten the total operation time of the circuit 10, two groups of final quantization coefficients are previously calculated and stored in the quantization table 13A, as shown in FIG. 4, and either one group of final quantization coefficients is read out from the quantization table 13A in response to a command of the controller CNT. In this modification, the switch 12 and the multiplier 14 are omitted and the multiplying of the scale factors and the basic quantization coefficients is not needed.

Of course, instead of the quantization table 13A in FIG. 4A, two quantization tables storing two groups of final quantization coefficients can be used. The controller CNT controls the reading the final quantization coefficients from either one of the quantization tables.

In this way, the image compression and coding circuit 10 of the present embodiment can find a predicted values of compressed data length for two types of quantization coefficients by compressing an input original image data one time Accordingly, the number of times of the coding for detecting a compressed data length before the actual encoding for fixed length coding can be reduced to ½ of that in the related art.

As to the prediction accuracy, ½ of the image is actually used for processing for one scale factor, and the image used is arranged in a lattice (checker board) pattern as shown in FIG. 3 in units of MCU. Namely, the scale factors are switched so that the MCUs for which the respective set of scale factors are selected become uniform In the vertical and horizontal directions. Accordingly, the entire image is uniformly compressed for each set of scale factors and prediction at a high accuracy is possible for a normal image.

Figure 1:
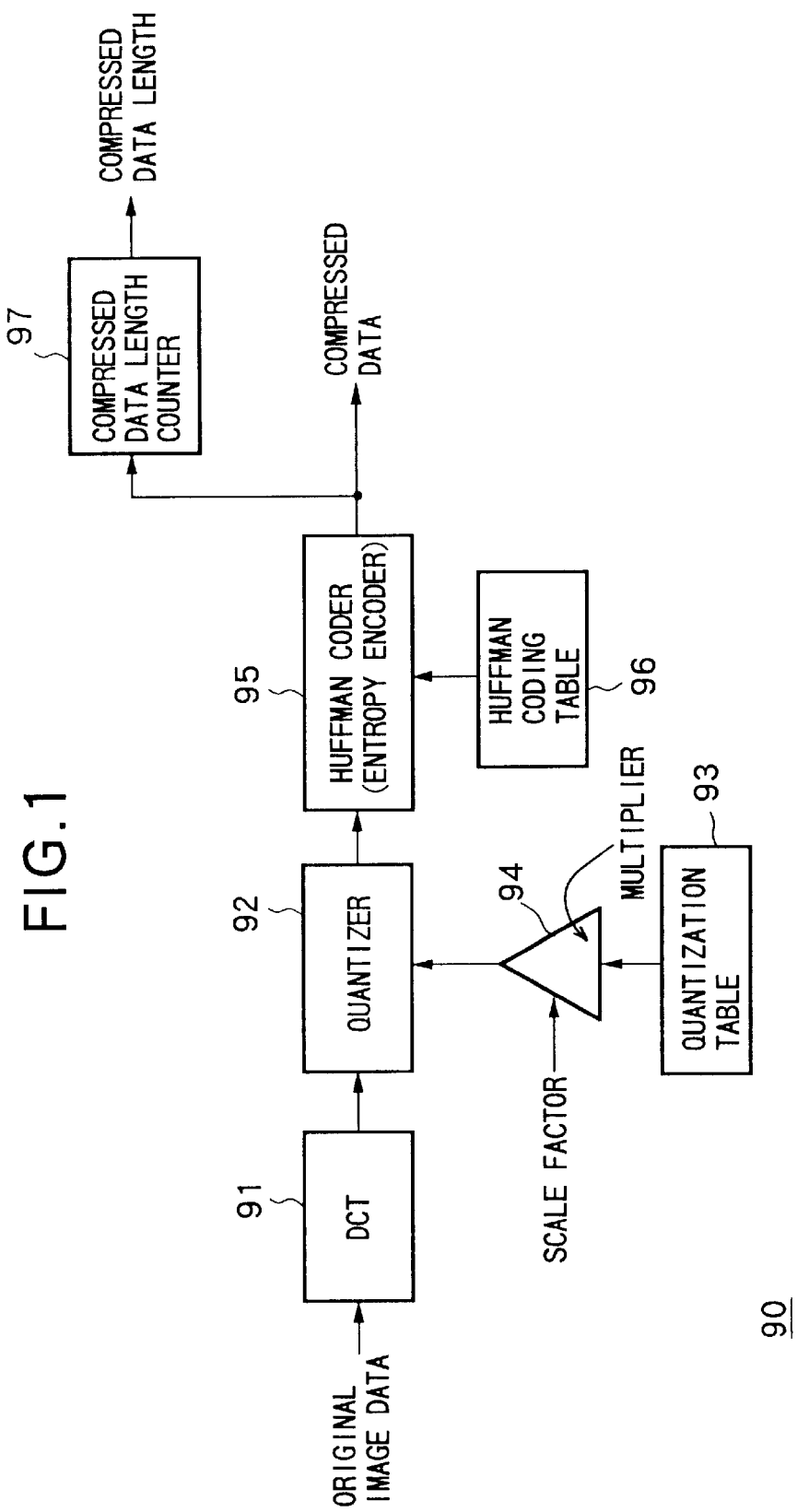
FIG. 1 is a view of the configuration of a general compression and coding circuit of the related art.

Also, the image compression and coding circuit 10 is configured by adding only counters and a scale factor switch to the compression and coding circuit 90 shown In FIG. 1. Therefore, only a small increase is sufficient In the hardware configuration.

Here, FIG. 5 shows a result when finding the relationship of a compressed data length and quantization coefficients by switching the scale factor as shown in FIG. 3. Namely, FIG. 5 shows the processing result of two separate original Images. Curve a Indicates a calculation result in the first compressed data length counter 18 or the second compressed data length counter 19 for a first image, curve b indicates a calculation result in the first compressed data length counter 18 or the second compressed data length counter 19 for a second image, curve c indicates an output result of the first double multiplier 20 or the second double multiplier 21 for the first image, that is, an estimated compressed data amount, curve d indicates an output result of the first double multiplier 20 or the second double multiplier 21 for the second image, that is, an estimated compressed data amount, curve e indicates a compressed data amount when actually compressing the entire image with respect to the first image, and curve f indicates a compressed data amount when actually compressing the entire image with respect to the second image.

As shown in FIG. 5, the curve "c" and curve "e" for the first image follow almost the same path. Also, the curve "d" and curve "f" for the first image follow almost the same path.

Accordingly, the prediction of a compressed data length by the image compression and coding circuit 10 of the present embodiment has sufficient accuracy and can be used for determining suitable scale factors for attaining a fixed length.

As the first embodiment of the present invention, the image coded data length calculation apparatus which is a part of the circuit 10 shown in FIGS. 2 and 4 was described. As a second embodiment of the present invention, an image data coding apparatus will be described.

The image data coding apparatus includes the evaluation means (unit) 31 and the second coding means (unit) 32 in addition to the components of the image coded data length calculation apparatus described above.

In the first embodiment, two data lengths were obtained on one frame image data to which the DCT operation was carried out. The evaluation means 31 inputs the two data lengths from the multipliers 20 and 21, evaluates the two data lengths and decides a suitable data length. One example on evaluation and decision of the suitable data length is a longer data length within a range of table amount of coded data.

The second coding means 32 codes the image data by using the set of scale factors by which the suitable data length is obtained. Namely, the second coding means 32 performs the DCT operation on the image data, the quantization on the DCT processed data by using the final quantization coefficients by which the suitable data length is obtained, the Huffman coding.

Such the second coding can be realized by using the DCT unit 11, the switch 12, the quantization table 13, the multiplier 14, the quantizer 15, the Huffman coding table 16, the Huffman coder 17 and the controller CNT, or by using DCT unit 11, the quantization table 13A, the quantizer 15, the Huffman coding table 16, the Huffman coder 17 and the controller CNT. In this second coding operation, the first and second data length counter 18 and 19, and the first and second double multipliers 20 and 21 are not operated.

In the second coding operation, the DCT processed result was obtained, so the operation of the DCT unit 11 can be omitted.

Note that the present invention is not limited to the present embodiment. A variety of modification can be made.

As one example of the frequency conversion, the DCT operation was described, but other frequency conversions can be applied. Also, as one example of the coding, the Huffman coding was described, but other codlings can be applied.

For example, in the present embodiment, one quantization table was used and scale coefficients for the same was switched to find a plurality of types of final quantization values. However, it is also possible not to use the scale coefficients, but for example to use a re-writable memory etc., prepare a plurality of quantization tables, and switch the quantization tables themselves.

Also, an example of a JPEG type image compression and coding circuit was explained as an example in the present embodiment, but the present invention may also be applied to other image compression and coding circuits such as those of the motion image coding scheme of the Moving Picture Coding Experts Group (MPEG). The present invention can be applied to any image compression and coding processing performing quantization and rate control.

Note that in the JPEG and other compression formats, for DC components in a single image, processing is not enclosed in one block and is affected by the DC components of the block compressed immediately before. Therefore, when the difference of two final quantization coefficients found simultaneously is large, the error of the predicted value becomes large in some cases. However, by using only one of the two final quantization coefficients only during quantization of the DC components, the above disadvantage can be prevented. The invention may be configured as such as well.

As explained above, according to the present invention, there can be provided a coded data length detection apparatus and method capable of detecting a coded data length at a high accuracy at a high speed.

Also, by detecting the coded data length at a high accuracy at a high speed, there can be provided an image coding apparatus and method capable of fixed length coding at a high speed at a high accuracy.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A coded data length detection apparatus comprising:
a frequency conversion means for frequency-converting a two dimensional arranged image data;
a quantization coefficient providing means for providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data;
a quantization means for reading one group of quantization coefficients among the plurality of groups of quantization coefficients from the quantization coefficients providing means and quantizating the data frequency-converted at the frequency conversion means by using the read one group of quantization coefficients;
a coding means for coding the quantizated result;
a coded data length calculation means for calculating a substantial data length of the coded results; and
a control means for repeatedly operating the quantization coefficient providing means, the quantization means, the coding means and the coded data length calculation means by the number of the plurality of groups of the quantization coefficients to carry out the quantization, the coding and coded data length calculation on the frequency-converted data obtained at the frequency conversion means and the respective group of the quantization coefficients, to thereby obtain a plurality of data lengths of the plurality of coded results.

2. A coded data length detection apparatus according to claim 1, wherein the frequency conversion means carries out a discrete cosine transform on the two dimensional image data, and
the quantization means carries out the quantization on the discrete cosine transformed data.

3. A coded data length detection apparatus according to claim 2, wherein the coding means carries out a Huffman coding.

4. A coded data length detection apparatus according to claim 3, wherein the coded data length calculation means comprises
a data length calculation means for calculating the length of the data coded at the coding means, and
a conversion means for converting the data calculated at the data length calculation means to a substantive data length in response to the discrete-arrangement of each block of the quantization coefficients.

5. A coded data length detection apparatus according to claim 4, wherein the quantization coefficient providing means comprises
a quantization coefficient holding means for holding basis quantization coefficients,
a plurality of scale factor holding means each holding one group of the factors,
a switching means for selectively outputting ne group of scale factors from one of plurality of scale factor holding means in response to a command from the control means, and
a multification means for multfying the scale factors output from the switching means and the basic quantization coefficients and outputting the same to the quantization means.

6. A coded data length detection apparatus according to claim 5, wherein the each of the plurality of scale factors comprises a plurality of blocks of scale factors, discretely arranged in a two dimensional lattice, the arrangement of blocks being substantially equivalent to that of the arrangement of blocks of the quantization coefficients.

7. A coded data length detection apparatus according to claim 4, wherein the quantization coefficient providing means comprises a quantization coefficient holding means for holding the plurality of groups of quantization coefficients, previously obtained by multifying basis quantization coefficients and a plurality of groups of scale factors, and the quantization coefficient holding means outputs one group of quantization coefficients among the plurality of groups of quantization coefficients in response to a command from the control means.

8. A coded data length detection apparatus according to claim 7, wherein the each of the plurality of scale factors comprises a plurality of blocks of scale factors, discretely arranged in a two dimensional lattice, the arrangement of blocks being substantially equivalent to the of the arrangement of blocks of the quantization coefficients.

9. A coded data length detection method comprising the steps of:

frequency-converting a two dimensional arranged image data;

providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data;

reading one group of quantization coefficients among the plurality of groups of quantization coefficients and quantizating the frequency-converted data by using the read one group of quantization coefficients;

coding the quantizated result;

calculating a substantial data length of the coded results; and repeatedly operating the quantization coefficient providing means, the quantization means, the coding means and the coded data length calculation means by the number of the plurality of groups of the quantization coefficients to carry out the quantization, the coding and coded data length calculation on the frequency-converted data and the respective group of the quantization coefficients, to thereby obtain a plurality of data lengths of the plurality of coded results.

10. A coded data length detection method according to claim 9, wherein in the frequency conversion step, a discrete cosine transform is carried out on the two dimensional image data, and in the quantization step, the quantization is carried out on the discrete cosine transformed image data.

11. A coded data length detection method according to claim 10, wherein the each of the plurality of scale factors comprises a plurality of blocks of scale factors, discretely arranged in a two dimensional lattice, the arrangement of blocks being substantially equivalent to that of the arrangement of blocks of the quantization coefficients;

in the frequency conversion step, a discrete cosine transform is carried out on the two dimensional image data, and in the quantization step, the quantization is carried out on the discrete cosine transformed image data.

12. A coded data length detection method according to claim 9, wherein in the coding step, a Huffman coding is carried out.

13. An image data coding apparatus comprising:

a frequency conversion means for frequency-converting a two dimensional arranged image data;

a quantization coefficient providing means for providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data;

a quantization means for reading one group of quantization coefficients among the plurality of groups of quantization coefficients from the quantization coefficients providing means and quantizating the frequency-converted data at the frequency conversion means by using the read one group of quantization coefficients;

a first coding means for coding the quantizated result;

a coded data length calculation means for calculating a substantial data length of the coded results;

a control means for repeatedly operating the quantization coefficient providing means, the quantization means, the coding means and the coded data length calculation means by the number of the plurality of groups of the quantization coefficients to carry out the quantization, the coding and coded data length calculation on the frequency-converted data obtained at the frequency conversion means and the respective group of the quantization coefficients, to thereby obtain a plurality of data lengths of the plurality of coded results;

an evaluation means for evaluating the plurality of data lengths and the plurality of coded data, obtained by using the plurality of groups of quantization coefficients to decide a suitable data length; and a second coding means for coding the image data by using the group of quantization coefficients by which the suitable data length is obtained.

14. An image data coding apparatus according to claim 13, wherein the second coding means comprises the frequency conversion means, the quantization coefficient providing means, the quantization means, and the first coding means, and wherein the quantization means reads the group of the quantization coefficients by which the suitable data length is obtained, from the quantization coefficient providing means and caries out the quantization of the data frequency-converted data at the frequency conversion mean by using the read group of quantization coefficients, and the first coding means codes the above quantizated result.

15. An image data coding apparatus according to claim 13, wherein the frequency conversion means carries out a discrete cosine transform on the two dimensional image data, the quantization means carries out the quantization on the discrete cosine transformed data, and the first and second coding means carry out a Huffman coding.

16. An image data coding method comprising the steps of:

frequency-converting a two dimensional arranged image data;

providing a plurality of groups of quantization coefficients, each group of quantization coefficients comprising a plurality of blocks of quantization coefficients, discretely arranged in a two dimensional lattice, each block being defined as a unit of the minimum coding unit, one group of quantization coefficients being used for coding the image data;

reading one group of quantization coefficients among the plurality of groups of quantization coefficients and quantizating the frequency-converted data by using the read one group of quantization coefficients;

coding the quantizated result;

a coded data length calculation means for calculating a substantial data length of the coded results;

repeatedly operating the quantization, the coding and coded data length calculation on the frequency-converted data and the respective group of the quantization coefficients, by the number of the groups of the quantization coefficients, to thereby obtain a plurality of data lengths of the plurality of coded results;

evaluating the plurality of data lengths and the plurality of coded data, obtained by using the plurality of groups of quantization coefficients to decide a suitable data length; and coding the image data by using the group of quantization coefficients by which the suitable data length is obtained.

17. An image data coding method according to claim 16, wherein in the frequency conversion step, a discrete cosine transform is carried out on the two dimensional image data, in the quantization step, the quantization is carried out on the discrete cosine transformed image data, and in the first and second coding steps, a Huffman coding is carried out.

* * * * *